US007477817B2

(12) United States Patent
Brandenburg (10) Patent No.: US 7,477,817 B2
(45) Date of Patent: Jan. 13, 2009

(54) PROBE FOR AN OPTICAL NEAR FIELD MICROSCOPE WITH IMPROVED SCATTERED LIGHT SUPPRESSION AND METHOD FOR PRODUCING THE SAME

(75) Inventor: Albrecht Brandenburg, March (DE)

(73) Assignee: Fraunhofer-Gesellschaft Zur Forderung (DE)

( * ) Notice: Subject to any disclaimer, the term of this patent is extended or adjusted under 35 U.S.C. 154(b) by 473 days.

(21) Appl. No.: 11/193,963

(22) Filed: Jul. 29, 2005

(65) Prior Publication Data

US 2006/0030842 A1 Feb. 9, 2006

Related U.S. Application Data

(63) Continuation of application No. PCT/EP03/14557, filed on Dec. 18, 2003.

(30) Foreign Application Priority Data

Jan. 31, 2003 (DE) ................. 103 03 927

(51) Int. Cl.
G02B 6/34 (2006.01)
G02B 21/00 (2006.01)
(52) U.S. Cl. ............... 385/37; 385/12; 385/130; 359/368
(58) Field of Classification Search ............ 385/37, 385/12, 130; 359/368
See application file for complete search history.

(56) References Cited

U.S. PATENT DOCUMENTS

| | | | |
|---|---|---|---|
| 5,354,985 A | 10/1994 | Quate | |
| 6,201,226 B1* | 3/2001 | Shimada et al. | 250/201.3 |
| 6,333,497 B2 | 12/2001 | Shimada et al. | |
| 6,408,122 B1 | 6/2002 | Shimada et al. | |
| 6,408,123 B1 | 6/2002 | Kuroda et al. | |
| 2002/0009262 A1* | 1/2002 | Kasama et al. | 385/36 |
| 2002/0036753 A1 | 3/2002 | Kasama | |

(Continued)

FOREIGN PATENT DOCUMENTS

DE 4314301 C1 5/1994

(Continued)

*Primary Examiner*—Michelle R. Connelly-Cushwa
*Assistant Examiner*—Rhonda S Peace
(74) *Attorney, Agent, or Firm*—Brooks Kushman P.C.

(57) ABSTRACT

The invention relates to a probe for an optical near field microscope, said probe comprising a planar carrier carrying a probe tip at least partially consisting of a transparent material. The invention also relates to a method of producing one such probe. The object of the invention is to provide a probe for an optical near field microscope and a method for the production thereof, whereby the probe can be produced with high reproducibility according to a simple technology and can have a simple but efficient light supply. According to the invention, the object is solved with a probe of the type mentioned in the introduction such that the carrier comprises an optical waveguide. With respect to the method for probe production the object mentioned above is solved according to the invention by a method comprising the following steps: a coating comprising an optical waveguide is applied to a substrate in a first step; a transparent layer is applied in a second step, such that the optical waveguide is arranged between the substrate and the transparent layer; the transparent layer is masked in at least one region above the probe tip in a third step; and the transparent layer is etched, forming the probe tip, in a fourth step.

29 Claims, 6 Drawing Sheets

U.S. PATENT DOCUMENTS

2006/0050373 A1 * 3/2006 Brandenburg et al. ....... 359/368

FOREIGN PATENT DOCUMENTS

| | | | |
|---|---|---|---|
| DE | 19509903 | A1 | 9/1996 |
| DE | 19713746 | A1 | 10/1998 |
| EP | 0860726 | A1 | 8/1998 |
| JP | 04-083138 | | 3/1992 |
| JP | 11281657 | | 10/1999 |

* cited by examiner

PROBE FOR AN OPTICAL NEAR FIELD MICROSCOPE WITH IMPROVED SCATTERED LIGHT SUPPRESSION AND METHOD FOR PRODUCING THE SAME

CROSS-REFERENCE TO RELATED APPLICATION

This application is a continuation of PCT application Ser. No. PCT/EP2003/014557, filed Dec. 18, 2003, to which priority is claimed.

BACKGROUND OF THE INVENTION

1. Field of the Invention

This invention relates to a probe for an optical near field microscope, said probe comprising a planar carrier carrying a probe tip at least partially consisting of a transparent material. The invention also relates to a method for producing such probe.

2. Background Art

Optical near field microscopes exploit the effect that a high optical resolution can be realized with the aid of a probe with a very small aperture at a very short distance to a sample surface. In order to achieve this, probes are for example produced from optical waveguides, which run to a point at an end due to drawing at high temperatures. The end of the fibre is coated with metal so that a small aperture arises at the pointed end of the optical waveguide, through which light can emanate. When using the microscope, the tip is brought to a very small distance to a sample surface, whereby the surface is illuminated by the small aperture of the fibre probe and the fibre probe is scanned over the sample surface at a very short distance to it.

In this respect the spatial resolution of the image acquired from the sample is essentially dependent on the tip radius of the fibre, the size of the aperture and the accuracy of guiding the fibre in the vertical direction when scanning over the sample.

By means of a piezo-mechanical drive or a shear-force mechanism, it is already possible to achieve very accurate guiding of the fibre probe in the vertical direction during scanning. However, the optical waveguide probes could only previously be manufactured with an aperture size of about 100 nanometers, which is an improvement of the optical resolution of an optical near field microscope compared to a conventional light microscope, but does not increase it by orders of magnitude.

In addition, the dimensions of the drawn fibres cannot be reproduced to the desired extent, so that after changing the fibre tip, the images from the optical near field microscope can vary with regard to resolution and contrast. Furthermore, only one single tip can be produced in each case with the fibre drawing method, so that the probes can be produced only with low productivity and therefore high costs.

DE 199 26 601 A1 describes a generic probe and an associated method in which the probe exhibits a funnel-shaped probe tip which has an internal cavity, the said probe tip extending through the thickness of a bending beam. Here, the internal side edges of the cavity funnel structure are covered with an oxide layer. For the manufacture of this probe a structure with a funnel-shaped pit and a retaining element are produced in separate process sequences. These two structures are then joined together in order to form the probe tip from the combination by etching.

Owing to the large number of process steps, this technology is complicated and expensive. In addition, inaccuracies in the probe dimensions can arise due to the joining step of the individual structures. With this structure it is not possible to pass light by means of the probe directly to the tip of the probe. It is only possible to position a light beam above the funnel opening so that light can impinge on the sample through the tip region of the probe tip.

U.S. Pat. Nos. 6,333,497 and 6,211,532 describe the probes and associated methods for optical near field microscopes with which evanescent waves are detected by the probe. With these microscopes the sample is illuminated from the rear and the probe detects the evanescent radiation and converts it into a photoelectric current, the signal of which is evaluated for generating an image. In the methods shown a hollow funnel-shaped pit is in each case etched in a first substrate and the internal surface of the pit is coated with a transparent material. The first substrate is then joined to a second substrate, whereupon the first substrate is etched so far until an internal hollow probe tip is formed from the second substrate. The second substrate is thinned down in a region below the probe tip such that a thin carrier is created on which the probe tip is placed.

These methods exhibit a large number of process steps, whereby in particular the joining step between the individual substrates is critical with respect to the achieved reproducibility of the probe dimensions. Due to the evanescent functioning principle, with these types of probe there is also no possibility provided for passing light to the respective probe tip.

SUMMARY OF THE INVENTION

The object of the invention is therefore to provide a probe for an optical near field microscope and a method of producing it, whereby the probe can be produced with high reproducibility in a simple technology and the probe exhibits a simple but efficient passage of light.

The object is solved according to the invention with a probe of the type mentioned in the introduction such that the carrier is an optical waveguide.

The probe according to the invention has the advantage that with the carrier, which exhibits the probe tip, light can be guided to the probe tip with the aid of the optical waveguide. Consequently, high accuracy and efficiency of the passage of light to the probe tip are achieved. Furthermore, the invention facilitates the coupling of the probe tip to an optical waveguide in a technologically simple manner with high reproducibility.

It is also possible to position the optical waveguide exactly at the probe tip during the manufacture of the carrier, whereby the probe can be produced with high accuracy and reproducible dimensions. With the solution according to the invention also a multitude of probes can be produced in parallel with reproducible properties, thus reducing the production costs and reducing the problems when changing the probe in an optical near field microscope.

According to a preferred embodiment of the invention, the probe tip is formed on a planar surface of the carrier. With this type of arrangement the probe tip can be easily produced with a high level of accuracy and reproducibility.

In a favorable variant of the invention the probe tip is formed as a full structure. This type of construction enables the probe tip to be manufactured from one single layer, whereby the probe can be formed inexpensively and still with high accuracy.

In an advantageous embodiment of the invention the transparent material of the probe tip comprises silicon oxide. This material is especially well suited for providing good light transmission of the probe tip and in addition can be well structured, whereby a very small tip radius of the probe tip can be realized for a high probe resolution.

In a favorable example of the invention the carrier is joined as a cantilever to a substrate. In this way the probe can be held and oscillated over the sample, so that the probe can be vertically tracked during a horizontal scan of a sample surface to be measured.

According to a preferred embodiment of the invention, the probe exhibits a light entry region. The light entry region has the advantage that light can be coupled into the probe in a low-loss manner.

Favorably, the light entry region is formed in the carrier and/or in a substrate with which the carrier is joined. Consequently, efficient light coupling in the carrier is possible.

According to a particularly advantageous variant of the invention, the probe exhibits a light exit region. Here, light can be well introduced into the probe tip from the optical waveguide. With this particular light exit the light can be guided efficiently onto a small opening in a tip region of the probe tip.

Preferably the light exit region in the carrier is formed in the vicinity of the probe tip. Then the light can be particularly well guided into the probe tip.

In a particularly favorable embodiment of the invention the light entry region and/or the light exit region is formed in the optical waveguide or in a transparent intervening layer between the optical waveguide and a substrate. This type of construction facilitates good coupling of light into and/or out of the optical waveguide, whereby a high luminous efficiency can be achieved.

It is also suggested that the light entry region and/or the light exit region exhibits a diffractive structure. The diffractive structure is particularly well suited for coupling light into a region or out of this region, whereby the light can be effectively used.

According to an advantageous embodiment of the invention, the diffractive structure exhibits a coupling grid. The coupling grid is particularly well suited to couple light directly into the light entry region and/or the light exit region.

Preferably the coupling grid exhibits curved grid lines. The light can then be very well focused. For example, the light can be focused directly onto a relatively small opening region in a tip region of the probe tip.

In a particularly favorable example of the invention the optical waveguide consists at least partially of silicon nitride. This material is particularly well suited to guiding light in the probe and in addition can be well structured so that an optical waveguide with very good line properties can be made available.

In a further special embodiment of the invention there is on at least one surface of the optical waveguide a transparent intervening layer, which is low refracting in comparison to a material of the optical waveguide. In this manner the light can be well guided in the optical waveguide.

According to a preferred variant of the invention, the transparent intervening layer is located between the optical waveguide and a substrate. In this way an attenuation of the optical wave propagation in the optical waveguide is prevented by the substrate.

Advantageously the transparent intervening layer is located between the optical waveguide and the probe tip. This intervening layer enables the light to be well transported in the optical waveguide. The transparent intervening layer acts here as a type of spacer through which an attenuation of the light guided in the optical waveguide, which for example would be generated by a metal layer directly on the optical waveguide, can be reduced.

According to a further advantageous example of the invention, the transparent intervening layer consists of silicon oxide, silicon oxinitride or magnesium fluoride. In particular due to their low refractive indices, these materials are especially well suited to the reduction of light attenuation in the optical waveguide, which would emanate from a material directly bordering the optical waveguide, such as for example silicon or a metal. In addition, these materials exhibit a high transparency and can be advantageously manufactured in a thin-film process.

According to a preferred embodiment of the invention, at least one circumferential area and/or a surrounding region of the probe tip is coated with a material which is opaque to light. This sort of coating can be used to minimise the effect of stray light on the sample to be measured.

Preferably, the opaque material is a metal layer. From a certain minimum thickness a metal layer is highly opaque, whereby the effect of stray light during detection can be prevented.

Advantageously, at least one tip region of the probe tip is transparent to light. This tip region acts advantageously as an aperture for the probe tip.

With regard to a method for probe production, the above mentioned object is solved according to the invention by a method with the steps: application of a coating to a substrate in a first step, whereby the coating exhibits an optical waveguide; application of a transparent layer in a second step, so that the optical waveguide is arranged between the substrate and the transparent layer; masking of the transparent layer at least in a region above the probe tip in a third step; and etching of the transparent layer while forming the probe tip in a fourth step.

The method according to the invention contains a number of steps which can be carried out consecutively preferably in a batch process, whereby a large number of probes can be manufactured simultaneously on one substrate. In this way, the individual steps of the method can be exactly matched to one another, whereby very high accuracies for the manufactured probe and also a high level of reproducibility of the probe dimensions can be achieved. With the method according to the invention a probe with a very small probe tip radius can be manufactured, whereby the probe exhibits in addition an integrated optical waveguide. In this way, very high optical probe resolutions and a simple but very effective light conduction in the probe can be achieved.

Preferably, the first step exhibits an application of a silicon nitride layer from which the optical waveguide is formed. An optical waveguide with very good light conduction properties can be manufactured with the silicon nitride layer.

In a favorable variant of the invention the first step exhibits a generation of at least one transparent intervening layer between the substrate and the optical waveguide, whereby the material of the transparent intervening layer is low refracting in comparison to the material of the optical waveguide. In this way, a probe can be manufactured with which the light can be easily transferred into the optical waveguide.

According to a particularly advantageous example of the invention, the first step exhibits a generation of at least one transparent intervening layer between the optical waveguide and the probe tip, whereby the material of the transparent intervening layer is low refracting in comparison to the material of the optical waveguide. In this way, the light is conducted preferentially in the optical waveguide. In addition, this step in the method can have the effect that an attenuation, which for example would arise with an opaque material directly on the optical waveguide, is reduced.

According to a preferred embodiment of the invention the generation of the intervening layer exhibits an application of at least one layer of silicon oxide, silicon oxinitride or magnesium fluoride. With these materials an attenuation of an opaque material on the light conduction in the optical waveguide can be suppressed.

It is also suggested that the method exhibits a formation of a light entry region in the substrate and/or in the coating on the substrate. Then a probe can be manufactured in which the light can be very well introduced, whereby the probe can operate with a high luminous efficiency.

In an advantageous embodiment of the invention the method exhibits a formation of a light exit region in the coating on the substrate. This step in the method ensures that light can be emitted from the probe.

An advantageous development of the invention can consist in that the formation of the light entry region and/or the light exit region exhibits the formation of a diffractive structure. With this step in the method light can be well passed in a certain direction in the light entry region and/or light exit region of the probe.

According to a particularly favorable embodiment of the invention, the formation of a diffractive structure exhibits etching and/or stamping out a coupling grid. In this way, very exact structures can be produced, which can refract or diffract light well, consequently contributing to a specific alignment of the light within the probe.

Favorably, the invention can be configured such that in the second step the transparent layer is applied with a layer thickness of about 1 to 5 μm, preferably about 2 to 20 μm or optimally with a layer thickness of about 3 to 8 μm. Such a thickness enables a probe tip to be manufactured with steep lateral edges and a small tip radius, whereby a highly accurate detection by the probe can be achieved.

In a preferred example of the invention the method exhibits etching of the substrate with the formation of a cantilever carrier which is joined to the substrate. Through this step in the method a probe can be manufactured which can be arranged so that it can be oscillated over a sample surface and thus well tracked in the vertical direction during horizontal scanning of the sample surface.

In a favorable variant of the invention the etching exhibits a wet chemical etching and a dry etching. By combining the two etching steps it is possible for an etching front to carefully approach a final substrate thickness for the formation of a cantilever carrier. The situation can also be achieved in that the probe tip is not or only slightly exposed to attack by the etching.

Preferably, the etching of the transparent layer in the fourth step is isotropic etching or a combination of isotropic and anisotropic etching. In this way, a particularly good formation of the probe tip can be achieved, whereby the probe tip preferably exhibits very steep lateral edges.

It is further suggested that the method exhibits an application of a layer opaque to light on at least one circumferential area of the probe tip and/or one surrounding region of the probe tip. In this way, the influence of scattered light from the region of the surrounding area of the probe tip and/or a surrounding region of the probe tip can be avoided with the finished probe.

In an advantageous example of the invention the opaque layer is vapor-deposited diagonally onto the probe tip. In this way, the situation can be achieved in that at least one circumferential area of the probe tip is covered by the opaque layer, whereas a tip region of the probe tip is kept free.

In a favorable variant of the invention the method exhibits the fitting of an opening into the opaque layer in a tip region of the probe tip with the formation of an opening. In this way, a transparent region of the probe tip can be produced, whereby the surrounding region of the opening remains covered by the opaque layer and light scatter is avoided.

According to an especially advantageous variant of the invention the fitting of an opening takes place with a spark erosion method and/or plasma etching. These methods are particularly well suited to producing an opening with a very small diameter, for example in a metal layer. Thus, a probe can be manufactured with a very small aperture diameter.

BRIEF DESCRIPTION OF THE DRAWINGS

The invention is explained in more detail based on the embodiments and the associated drawings. These show.

DETAILED DESCRIPTION OF THE PREFERRED EMBODIMENT(S)

Figure 1:
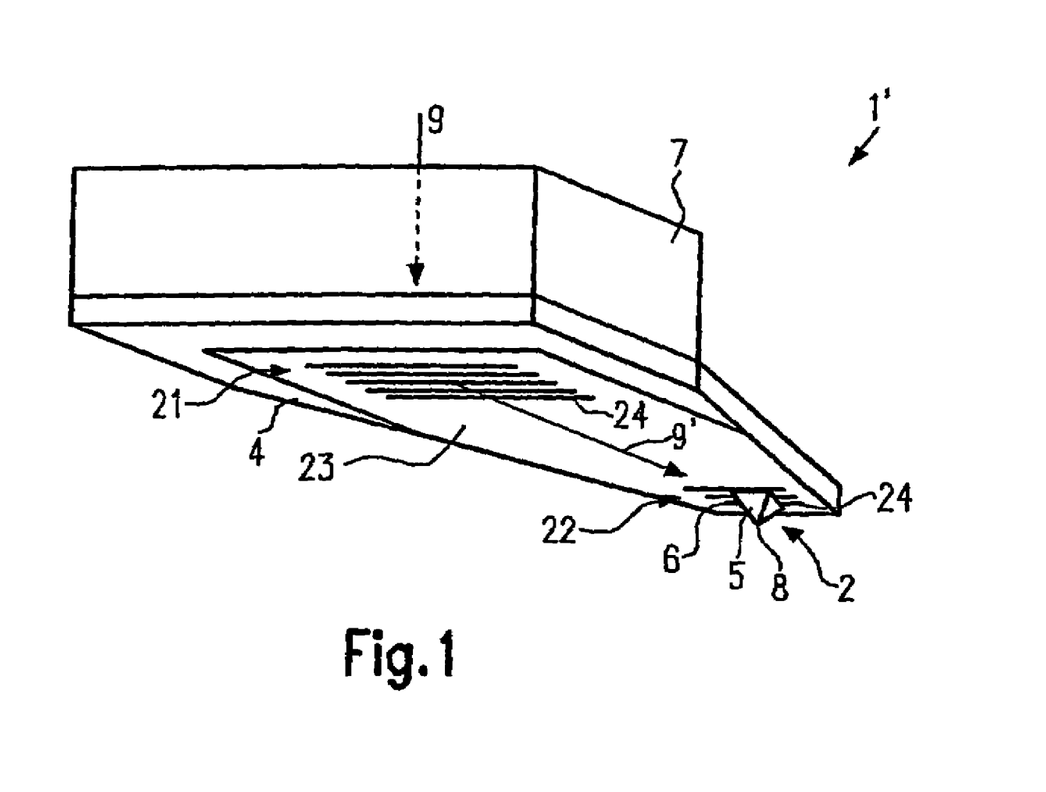
FIG. 1 is a schematic perspective view of an embodiment of a probe for an optical near field microscope.

FIG. 1 shows a schematic perspective view of a probe 1 for an optical near field microscope according to an embodiment. The probe exhibits a planar carrier 3. The planar carrier 3 has an approximately triangular shape and consists in the illustrated example of silicon, but can also consist of a different material, for example of a material transparent to light, such as for example glass. In another embodiment variant the carrier 3 can also be formed in the shape of an approximately rectangular, long-shaped bending beam.

At the front free tip of a longitudinal surface 4 of the carrier 3, which is illustrated towards the bottom in FIG. 1, a probe tip 2 is formed. In the illustrated embodiment the probe tip 2 is formed in a pyramid shape, but can also be formed in a different embodiment, especially e.g. cone shaped.

The illustrated probe tip 2 exhibits four approximately triangular circumferential areas 5 and has a tip region 8 with a very small tip radius, which preferably is <100 nanometers and in the illustrated example lies in the magnitude of approximately 10 to 30 nanometers. The probe tip 2 is placed with its approximately rectangular or also round base area (not illustrated) on an optical waveguide 23. Here, a low refracting intervening layer, for example a silicon oxide layer, magnesium fluoride layer, aluminum fluoride layer or a layer combination of these materials is formed between the optical waveguide 23 of the probe tip 2.

In the illustrated embodiment the optical waveguide 23 consists of a high refracting material such as silicon nitride, but can be formed from tantalum oxide, niobic oxide, tin oxide, titanium oxide or a combination of these materials. It exhibits a light entry region 21 and a light exit region 22. The regions 21 and 22 each exhibit a diffraction grating 24 which are formed spaced approximately parallel to one another in the optical waveguide 23. The diffraction gratings 24 act as diffractive structures with which a light beam 9 can be coupled into the optical waveguide 23 in the light entry region 21 and in the light exit region 22 can be coupled out of the optical waveguide 23 into the probe tip 2. Advantageously, the light exit region is therefore in the illustration located directly above the probe tip 2.

The light beam 9 is guided in the optical waveguide 23 along a direction 9' up to the probe tip 2. When using the microscope the light beam 9 is passed out of the probe tip region 8 of the probe tip 2 onto a sample (not shown).

The probe 1 is sheathed in a metal layer 15, which preferably consists of aluminum (not shown in FIG. 1), whereby the tip region 8 of the probe tip 2 exhibits an opening in the metal layer 15 through which the light 9 can impinge on a sample.

The carrier 3 of the probe 1 rests on a substrate 7. Here the region of the carrier 3, on which the probe tip 2 is located, is formed as a cantilever carrier with the substrate 7 as fulcrum.

Figure 2:
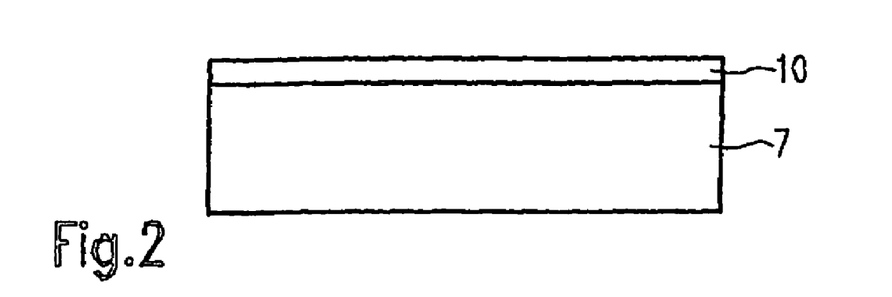
FIGS. 2 to 15 show an embodiment of a method for the production of a probe, for example of the probe according to FIG. 1, in a schematic illustration.

FIG. 2 shows a first partial step of an example of a method for producing a probe, such as the probe of FIG. 1. In the first partial step a protective layer 10 is deposited onto a substrate 7, here shown in cross-section. For example, the protective layer 10 consists of silicon nitride, which is, for example, deposited with a CVD method.

FIGS. 3 to 6 show partial steps of a first step in the method depicted in the example.

Figure 3:
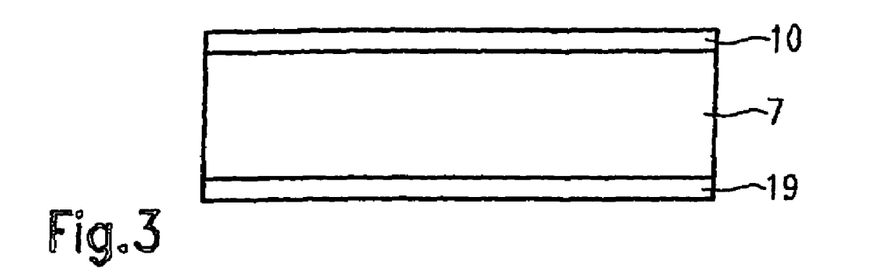

FIG. 3 illustrates a second partial step of an example of the method, in which a buffer layer 19 is applied to the structure of FIG. 2 on the side of the substrate 7 opposite the protective layer 10. In the illustrated embodiment the buffer layer 19 consists of silicon oxide.

In other embodiments of the invention which are not illustrated the buffer layer 19 can consist of a different low-refracting material such as for example silicon oxinitride or magnesium fluoride. The buffer layer 19 preferably exhibits a high transparency and can advantageously be deposited or applied in a thin-film process, such as a CVD method.

Figure 4:
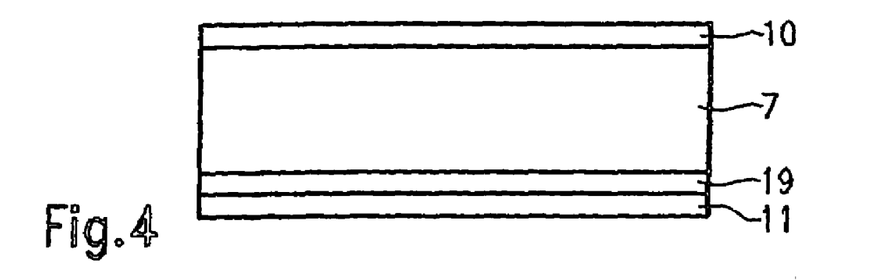

FIG. 4 shows the structure of FIG. 3 in which according to a third partial step of the example method, an optical waveguide layer 11 has been applied to the buffer layer 19. The optical waveguide layer 11 consists for example of silicon nitride and can be deposited with a CVD method.

In another embodiment of the invention which is not shown the optical waveguide layer 11 can, for example, be formed from tantalum oxide, titanium oxide, silicon oxinitride or a doped silicon oxide such as phosphor silicate glass. In particular the optical waveguide layer 11 exhibits a material with a high refractive index and high transparency. Preferably the optical waveguide layer 11 has a high resistance, for example, against aggressive environments and can preferably be manufactured in a thin-film deposition process.

Preferably the material and the deposition parameters of the optical waveguide layer 11 are selected such that the optical waveguide can be produced with as less stress as possible so that the optical waveguide also then remains straight when the substrate 7 is etched away.

Figure 5:
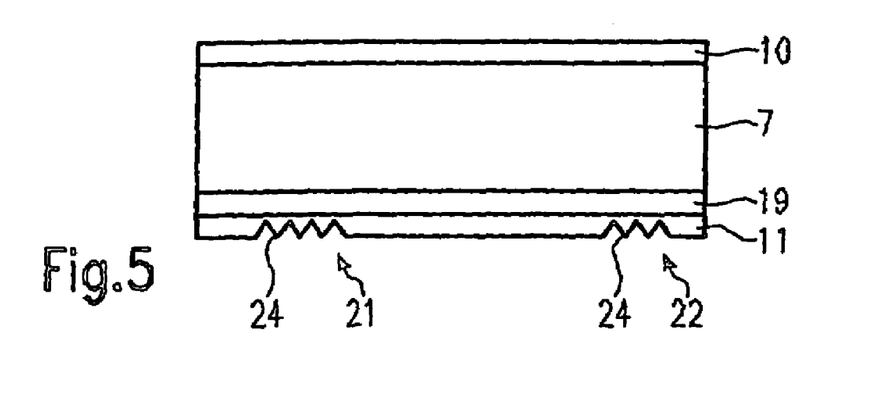

FIG. 5 shows the structure from FIG. 4 after a fourth partial step of the example method. In the fourth partial step grid-shaped diffractive structures 24, which define a light entry region 21 and a light exit region 22, have been introduced into the optical waveguide layer 11.

In other embodiments of the invention which are not shown the diffractive structures 24 can also be introduced into the buffer layer 19 or into the substrate 7, for example by etching. For example, focusing grid structures can be produced which bundle the light in the light entry region 21 towards the optical waveguide 11 and/or in the light exit region towards the probe tip 2. This can be reached by curved grid lines.

Figure 6:
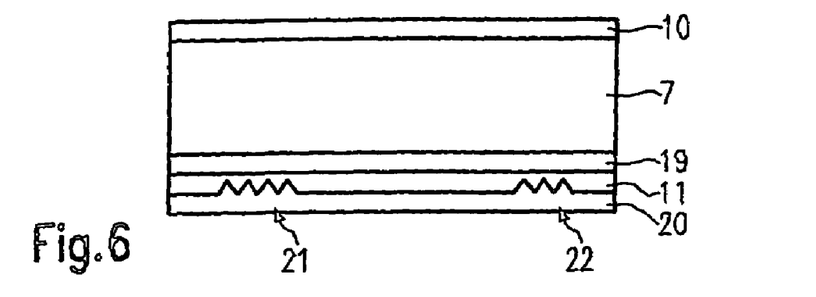

FIG. 6 shows the structure from FIG. 5 after a fifth partial step of the example method in which a further buffer layer 20 has been applied to the structured optical waveguide layer 11.

This further buffer layer 20 consists of a low-refracting transparent material, such as for example silicon oxide or magnesium fluoride and can be deposited in a thin-film deposition process, such as for example a CVD method.

Figure 7:
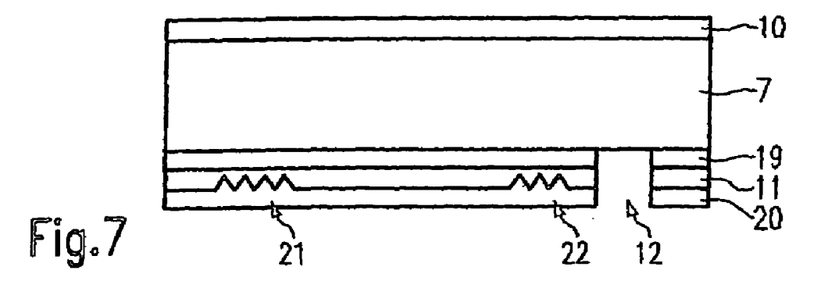

FIG. 7 shows the structure of FIG. 6 after a sixth partial step in the example method. In the sixth partial step first a masking layer is applied onto the buffer layer 22. This is structured by means of photolithography so that a window in the masking layer remains above an opening region 12 that is to be etched. The buffer layer 20, the optical waveguide layer 11 and the buffer layer 19 are etched down to the substrate 7 through the window in the masking layer. The opening region 12 is created in the form of a pit with approximately vertical side walls which later defines the structure of the cantilever carrier 3 of the probe 1.

Figure 8:
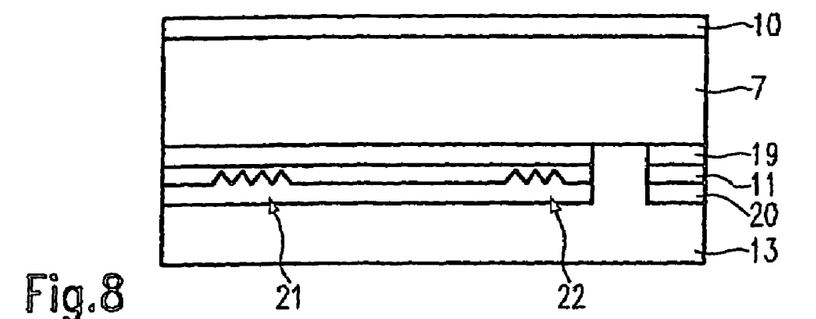

FIG. 8 shows the structure of FIG. 7 after a seventh partial step or after a third step in the example method. In this step in the method a transparent layer 13 is applied to the side of the structure of FIG. 7 on which the opening region 12 is located. In the illustrated example the transparent layer 13 is applied with a thickness of approximately 5 µm. In the illustrated embodiment it consists of silicon oxide and can be deposited in a CVD method.

In other embodiments the layer thickness of the transparent layer 13 is approximately 1 to 30 µm, preferably approximately 2 to 20 µm or in an optimum variant of the invention approximately 3 to 8 µm.

Figure 9:
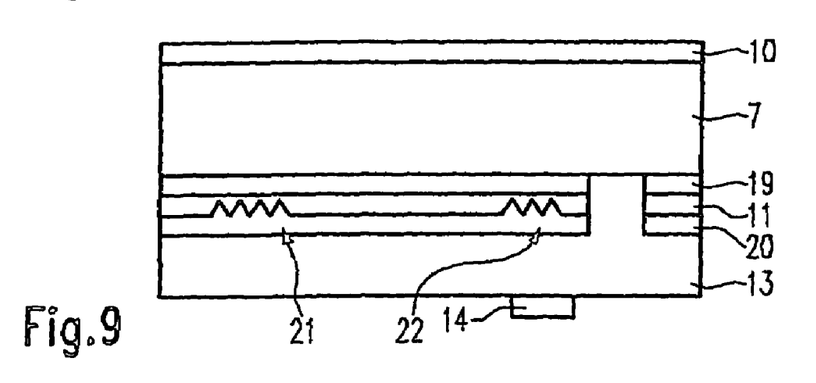

FIG. 9 shows the structure of FIG. 8 after an eighth partial step or a third step in the example method, in which onto the transparent layer 13 a mask 14 has been applied. To produce the mask 14 first a flat layer 14 was applied to the transparent layer 13. The layer 14 can for example consist of a-silicon which for example has been deposited by means of a sputter method or a vapor-deposition method. The a-silicon layer can also be doped in a special embodiment of the invention. The a-silicon layer is structured by means of photolithography such that a layer region of the layer 14, as shown in FIG. 9, remains on the transparent layer 13, in which the probe tip 2 is to be formed. This region corresponds approximately to the region which is opposite the light exit region 22.

Figure 10:
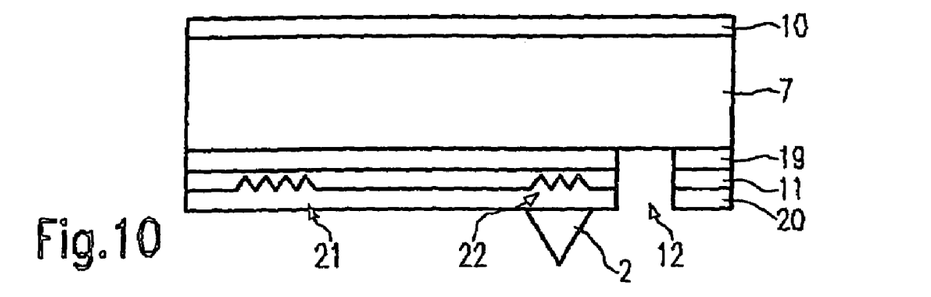

FIG. 10 shows the structure from FIG. 9 after a ninth partial step or a fourth step in the example method in which the transparent layer 13 has been etched by means of an isotropic etching step or by means of a combination of isotropic and anisotropic etching, for example, wet chemical with an HF etcher in combination with a dry etching step. When doing this, an approximately pyramid shaped or cone shaped structure, the probe tip 2, is created on the buffer layer 20. The probe tip 2 with its supporting surface is approximately opposite the light exit region 22. In a preferred embodiment of the invention a lateral prestructuring stage with one or more dry etching steps can take place before the wet chemical etching.

Figure 11:
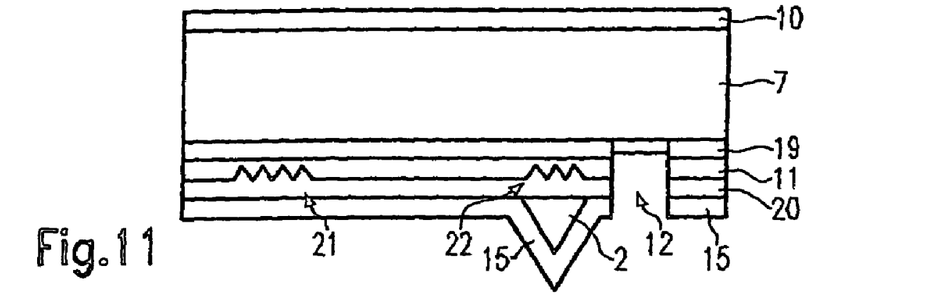

FIG. 11 shows the structure from FIG. 10 after a tenth partial step of the example method. In the tenth partial step a layer 15, opaque to light, is applied to the side of the structure from FIG. 10 which exhibits the probe tip 2. This opaque layer 15 can be for example a metal layer, such as e.g. an aluminium layer, which for example can be applied with a sputter method or a vapor deposition method.

Figure 12:
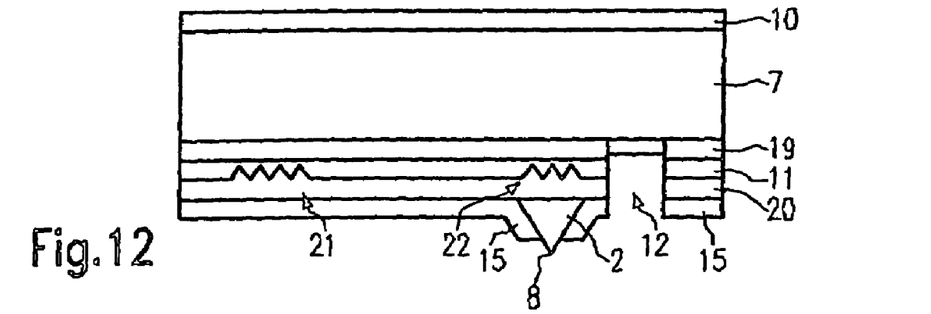

FIG. 12 shows the structure from FIG. 11 after an eleventh partial step of the example method in which a spark erosion method and/or a plasma etching method is used to open the opaque layer 15 in the tip region 8 of the probe tip 2. The opened probe tip region 8 has an approximate diameter of <100 nanometers, preferably from approximately 20 to 50 nanometers.

Figure 13:
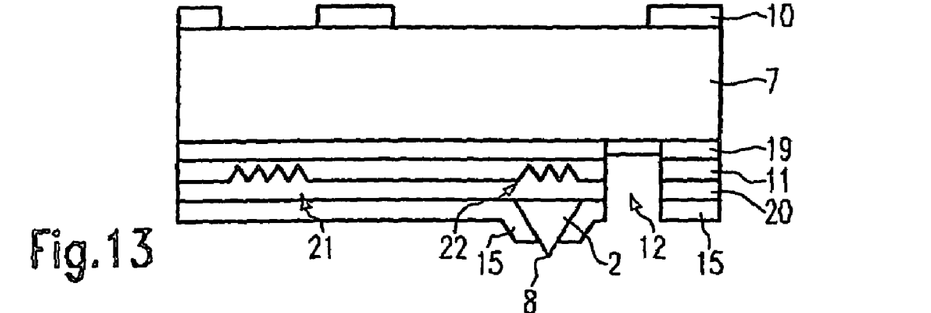

FIG. 13 shows the structure from FIG. 12 after a twelfth partial step in the example method. In the twelfth partial step the protective layer 10 is structured on the side of the structure from FIG. 12 opposite the probe tip 2. In the illustrated example a dry etching method is used for this. In other examples of the method which are not shown a wet etching process can also be used. After structuring, those regions of the protective layer 10 remain which are to cover regions of the substrate 7 which should not be etched in a following step as shown in FIG. 14.

Figure 14:
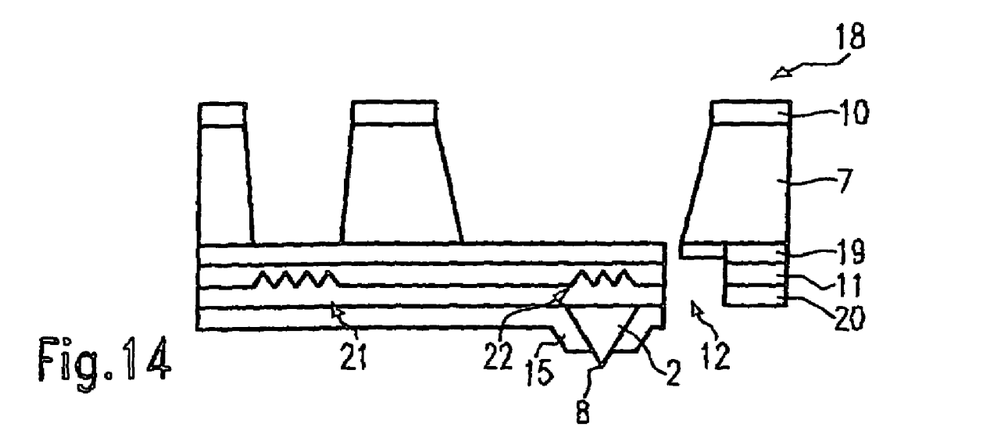

FIG. 14 shows the structure from FIG. 13 after a thirteenth partial step of the example method in which the structure from FIG. 13 has been etched while using the remaining regions of the protective layer 10 as masking layer and a metallizing layer 15 has been applied to the underside of the structure or to the probe tip side. The etching can take place with a wet chemical etching process, for example with KOH. However, with a pure wet chemical etching an undesired etching of the probe tip on the other wafer side can occur. According to an embodiment of the method according to the invention a combined etching of wet chemical etching and then dry etching can therefore be used with which the etching fronts can carefully approach the etching surface for creating the cantilever structure 3. At the end of the etching step the part of the structure on which the probe tip 2 is located is separated from a remaining material 18.

The metallization layer 15 can be applied over all the area of the etched structure, for example by means of a sputter method or vapor-deposition. The probe tip region 8 of the probe tip 2 can, for example, in the following then be exposed with a spark erosion method. In a further advantageous method the metallization layer 15 can be applied onto the probe tip side of the probe 1 from the side such that only the probe tip region 8 remains free. FIG. 14 corresponds approximately to the cross-section along the line A-B in FIG. 16.

Figure 15:
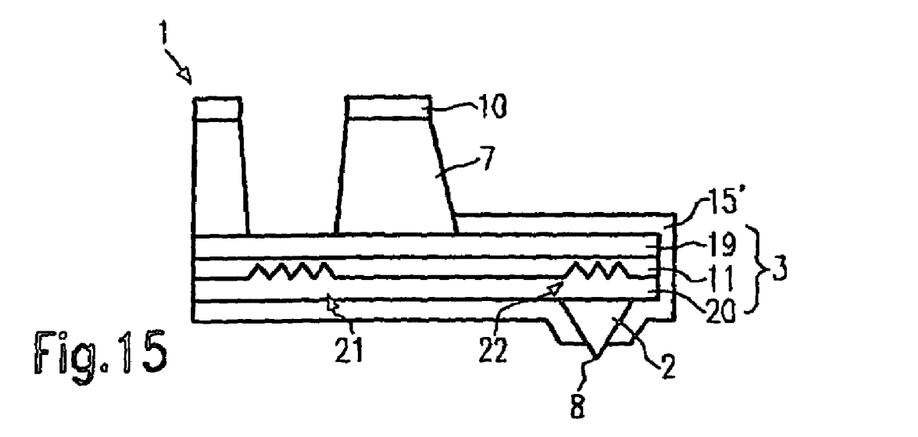

FIG. 15 shows the structure with the probe tip 2 from FIG. 14 after a last partial step of the example method in which a metallization 15' of the upper side of the structure then occurs. With this step the complete region of the optical waveguide 11 apart from the probe tip region 8 of the probe tip 2 is sheathed with a metallization layer 15 or 15', whereby the occurrence of scattered light during detection is reduced or prevented.

Figure 16:
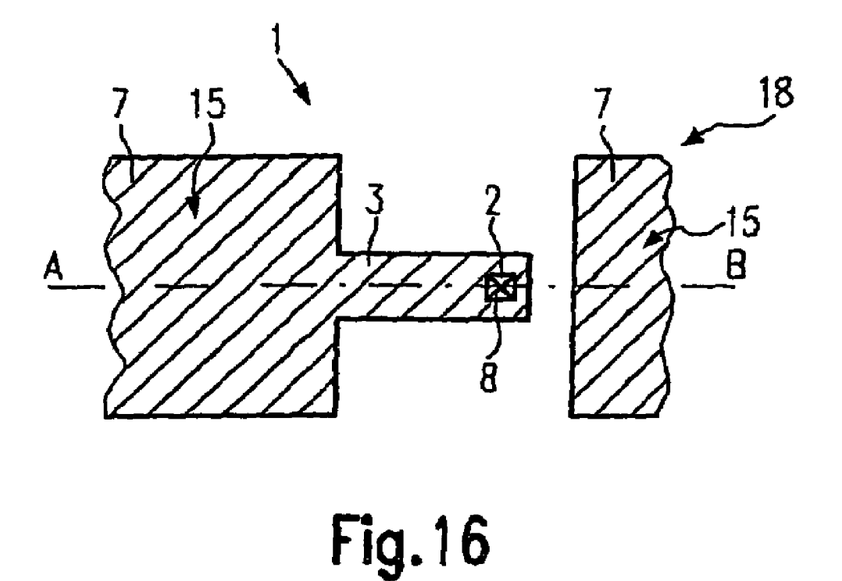
FIG. 16 is a schematic plan view onto the probe tip side of a probe with a carrier in the form of a bending beam.

FIG. 16 shows a plan view onto the probe tip end of the probe 1 and the underside of the remaining material 18 of FIG. 14. The probe 1 exhibits a carrier 3 in the shape of a rectangular long bending beam shown in the plan view. In the vicinity of the free end of the bending beam 3 the probe tip 2 is formed. The probe tip side of the probe 1 and the underside of the remaining material 18 are covered extensively with the metallization layer 15 except for the probe tip region 8 of the probe tip 2.

Figure 17:
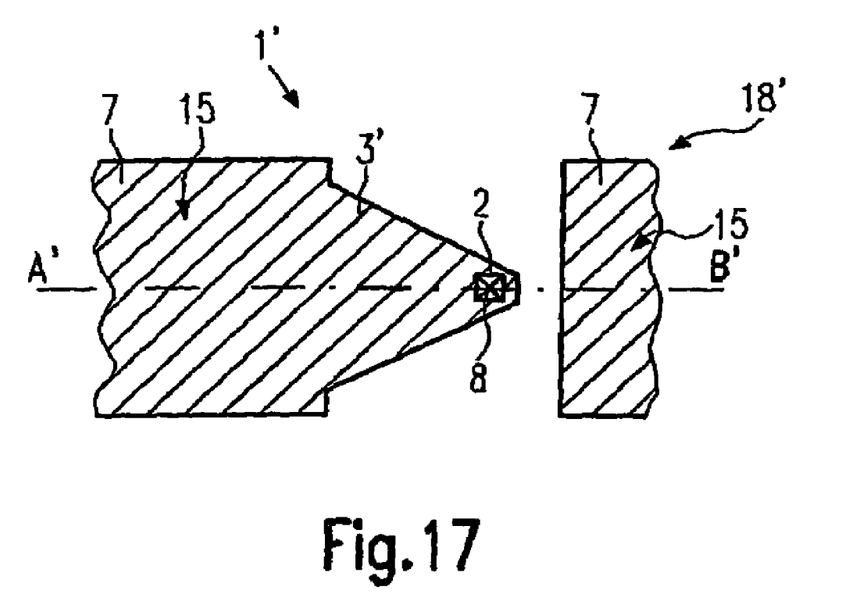
FIG. 17 is a schematic plan view onto the probe tip side of a probe with a carrier in the form of a triangle.

FIG. 17 shows a further variant of a probe 1' which can be manufactured similar to the probe 1, but which exhibits a different carrier shape. The probe 1' is illustrated in FIG. 17 in the plan view onto the probe tip side and with the remaining material 18' after the etching and the metallization layer deposition. The probe shape of the probe 1' corresponds approximately to the probe 1' which is illustrated in FIG. 1. The probe 1' exhibits a carrier 3' which is formed approximately triangular. At the free tip of the triangle of the carrier 3' the probe tip 2 is formed. The probe tip side of the probe 1', along with the underside of the remaining material 18', is covered extensively with the metallization layer 15 except for the probe tip region 8 of the probe tip 2. The triangular form of the carrier 3' has the advantage that the torsion oscillations of the carrier or cantilever are well suppressed.

Separation of the structures occurs, for example, with a standard wafer saw. The probe tip 2 and the carrier 3 need special mechanical protection during this step.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Probe for an optical near field microscope which exhibits a planar carrier with the probe tip, wherein the probe tip consists at least partially of a transparent material and is formed as a full structure, the carrier exhibits an optical waveguide with a light entry region and/or a light exit region, wherein the light entry region and/or the light exit region exhibits a diffractive structure, while a transparent intervening layer, which is low-refracting in comparison to a material of the optical waveguide, is located on at least one surface of the optical waveguide, being between the optical waveguide and a substrate.

2. Probe according to claim 1, characterized in that the probe tip is formed on a planar surface of the carrier.

3. Probe according to claim 1, characterized in that the transparent material of the probe tip exhibits silicon oxide.

4. Probe according to claim 1, characterized in that the carrier is joined as a cantilever to a substrate.

5. Probe according to claim 1, characterized in that the light entry region is formed in the carrier and/or in a substrate to which the carrier is joined.

6. Probe according to claim 1, characterized in that the light exit region is formed in the carrier close to the probe tip.

7. Probe according to claim 1, characterized in that the light entry region and/or the light exit region is formed in the optical waveguide or in a transparent intervening layer between the optical waveguide and a substrate.

8. Probe according to claim 1, characterized in that the diffractive structure exhibits a coupling grid.

9. Probe according to claim 8, characterized in that the coupling grid exhibits curved grid lines.

10. Probe according to claim 1, characterized in that the optical waveguide consists at least partially of silicon nitride.

11. Probe according to claim 1, characterized in that the transparent intervening layer is located between the optical waveguide and the probe tip.

12. Probe according to claim 1, characterized in that the transparent intervening layer consists of silicon oxide, silicon oxinitride or silicon nitride.

13. Probe according to claim 1, characterized in that at least one circumferential area and/or a surrounding region of the probe tip is coated with a material that is opaque to light.

14. Probe according to claim 13, characterized in that the opaque material is a metal layer.

15. Probe according to claim 1, characterized in that at least one tip region of the probe tip is transparent to light.

16. Method for the production of a probe with a probe tip for an optical near field microscope, in particular a probe for an optical near field microscope which exhibits a planar carrier with the probe tip, wherein the probe tip consists at least partially of a transparent material and is formed as a full structure, the carrier exhibits an optical waveguide with a light entry region and/or a light exit region, characterized in that the light entry region and/or the light exit region exhibits a diffractive structure, wherein the method comprises the steps:

application of a coating to a substrate in a first step, wherein the coating exhibits an optical waveguide;

application of a transparent layer in a second step, so that the optical waveguide is arranged between the substrate and the transparent layer;

masking of the transparent layer at least in one region of the probe tip in a third step; and isotropic etching of the transparent layer with the formation of the probe tip in a fourth step characterized in that the method exhibits further the following steps:

the formation of a light entry region in the substrate and/or in the coating on the substrate;

the formation of a light exit region in the coating on the substrate;

wherein the formation of the light entry region and/or of the light exit region exhibits the formation of a diffractive structure.

17. Method according to claim 16, characterized in that the first step exhibits an application of a silicon nitride layer from which the optical waveguide is formed.

18. Method according to claim 16, characterized in that the first step exhibits the production of at least one transparent intervening layer between the substrate and the optical waveguide, wherein the material of the transparent intervening layer is low-refracting in comparison to the material of the optical waveguide.

19. Method according to claim 18, characterized in that the production of the intervening layer comprises an application of at least one layer of silicon oxide, silicon oxinitride or magnesium fluoride.

20. Method according to claim 16, characterized in that the first step exhibits the production of at least one transparent intervening layer between the optical waveguide and the probe tip, wherein the material of the additional transparent intervening layer is low-refracting in comparison to the material of the optical waveguide.

21. Method according to claim 16, characterized in that the formation of the diffractive structure exhibits an etching and/or stamping of a coupling grid.

22. Method according to claim 16, characterized in that in the second step the transparent layer is applied with a layer thickness of approximately 1 to 30 μm, preferably approximately 2 to 20 μm or optimally with a layer thickness of approximately 3 to 8 μm.

23. Method according to claim 16, characterized by an etching of the substrate with the formation of a cantilever carrier which is joined to the substrate.

24. Method according to claim 23, characterized in that the etching of the substrate exhibits a wet chemical etching and a dry etching.

25. Method according to claim 16, characterized in that the etching of the transparent layer in a fourth step is an isotropic etching or a combination of isotropic and anisotropic etching.

26. Method according to claim 16, characterized by an application of a layer, opaque to light, on at least one circumferential area of the probe tip and/or a surrounding region of the probe tip.

27. Method according to claim 26, characterized in that the opaque layer is vapor-deposited diagonally onto the probe tip.

28. Method according to claim 26, characterized by an application of an opening in the opaque layer in a tip region of the probe tip with the formation of an aperture.

29. Method according to claim 28, characterized in that the application of an opening occurs with a spark erosion method and/or plasma etching.

* * * * *